United States Patent
Kaikkonen et al.

(10) Patent No.: US 7,864,724 B2
(45) Date of Patent: Jan. 4, 2011

(54) ENHANCED UE OUT-OF-SYNC BEHAVIOR WITH GATED UPLINK DPCCH OR GATED DOWNLINK F-DPCH OR DPCCH TRANSMISSION

(75) Inventors: Jorma Kaikkonen, Oulu (FI); Anna-Mari Vimpari, Oulu (FI); Mads Hintz-Madsen, Oulu (FI)

(73) Assignee: Nokia Corporation, Espoo (FI)

( * ) Notice: Subject to any disclaimer, the term of this patent is extended or adjusted under 35 U.S.C. 154(b) by 730 days.

(21) Appl. No.: 11/796,115

(22) Filed: Apr. 25, 2007

(65) Prior Publication Data

US 2007/0286155 A1 Dec. 13, 2007

Related U.S. Application Data

(60) Provisional application No. 60/797,943, filed on May 5, 2006.

(51) Int. Cl.
*H04B 7/185* (2006.01)
(52) U.S. Cl. ...................................... 370/318; 370/328
(58) Field of Classification Search .................. None
See application file for complete search history.

(56) References Cited

U.S. PATENT DOCUMENTS

| 6,493,541 | B1 | 12/2002 | Gunnarsson et al. ........... 455/69 |
| 6,763,011 | B1 | 7/2004 | Häkkinen et al. |
| 2002/0110088 | A1 | 8/2002 | Lundby et al. ............... 370/252 |
| 2005/0281222 | A1 | 12/2005 | Ranta-Aho et al. .......... 370/328 |

FOREIGN PATENT DOCUMENTS

EP 1083678 3/2001

OTHER PUBLICATIONS

U.S. Appl. No. 11/411,980, filed Apr. 25, 2006, M. Kuusela et al.
U.S. Appl. No. 11/499,849, filed Aug. 4, 2006, J. Kaikkonen et al.
3GPP TR 25.903 v0.2.1, Group Radio Access Network; Continuous Connectivity for Packet Data Users (Release 7), Denver USA, Feb. 13-17, 2006.
3GPP TS 25.214 v6.8.0, Group Radio Access Network; Physical layer procedures (FDD) (Release 6), Mar. 2006.
3GPP TS 25.331 V6.9.0; sections 8.5.4, 8.5.6; 2006.
3GPP TS 25.101 V6.11.0; "3$^{rd}$ Generation Partnership Project; Technical Specification Group Radio Access Network; User Equipment (UE) radio transmission and reception (FDD)"; section 6.4.4; 2006.

(Continued)

*Primary Examiner*—Erika A Gary

(57) ABSTRACT

A method and corresponding equipment by which a wireless terminal communicatively coupled to a radio access network adapts to gating in respect to a downlink signal from a radio access network carrying power control commands (e.g. the F-DPCH of UTRAN with WCDMA), including gating by the radio access network of either just the power control commands or the channel itself, or gating of reception of the power control commands by the user equipment. The adaptation can include changing values of parameters used in determining when the wireless terminal declares a radio link failure, or instead only changing the procedures used to determine whether a parameter value has been achieved and thus only effectively changing the parameter values (or one or more of the parameters can be actually and effectively changed).

22 Claims, 2 Drawing Sheets

OTHER PUBLICATIONS

3GPP Ts 25.214 V6,8,0; "3rd Generation Partnership Project; Technical Specification Group Radio Access Network; Physical layer procedures (FDD)"; pp. 9-13; 2006.

3GPP TSG RAN2#47, Change Request, "Faster L1 DCH synchronization"; section 8.5.6; 2005.

Chinese Office Action mailed Feb. 12, 2010 in corresponding Chinese Patent Application No. 200780016120.9 (5 pages) and English translation thereof (5 pages).

Samsung Electronics Co., TSG-RAN Working Group 1 meeting #6, TSGR1#6871, "Text proposal of DPCCH gating in Control Only Substate," Jul. 13-16, 1999, Espoo, Finland (3 pages).

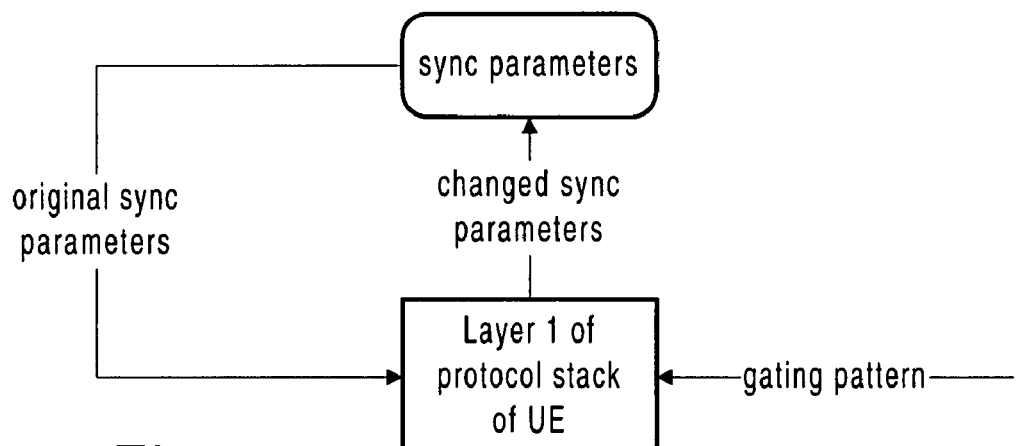
Fig. 2
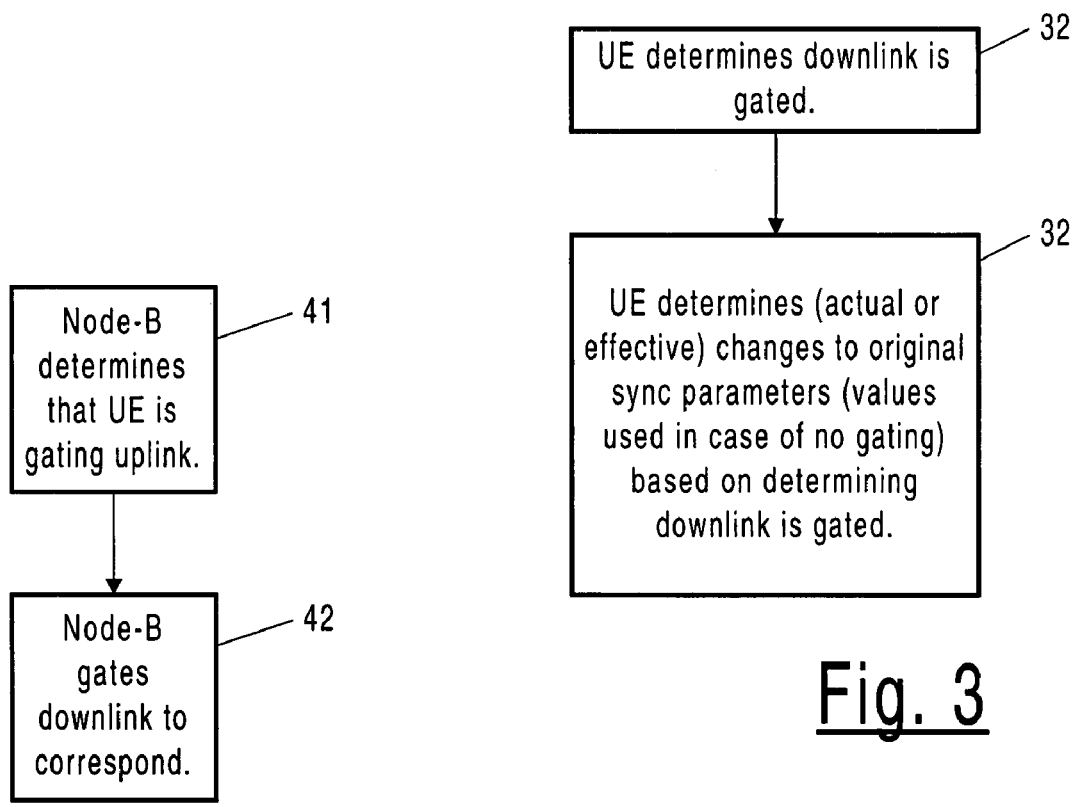
Fig. 3
Fig. 4

ENHANCED UE OUT-OF-SYNC BEHAVIOR WITH GATED UPLINK DPCCH OR GATED DOWNLINK F-DPCH OR DPCCH TRANSMISSION

CROSS REFERENCE To RELATED APPLICATION

Reference is made to and priority claimed from U.S. provisional application Ser. No. 60/797,943 filed 5 May 2006.

BACKGROUND OF THE INVENTION

1. Technical Field

The present invention pertains to the field of wireless communications. More particularly, the present invention pertains to procedures to be followed by wireless terminals in case of gating of transmit power by the wireless terminals.

2. Discussion of Related Art

In some wireless communications systems, in particular UMTS (Universal Mobile Telecommunications System) using WCDMA (Wideband Code Division Multiple Access) for the air interface of its UTRAN (UMTS terrestrial radio access network), in order to save power a UE (user equipment) wireless communication terminal could turn its transmit power on and off, i.e. it could gate its transmit power according to a gating pattern (among other factors), i.e. according (at least in part) to a duty cycle having an on period and an off period. Using a UTRAN with WCDMA as an example, a UE sends data and/or control information (such as pilot bits) to a Node-B of the UTRAN, and the Node-B then estimates the UE uplink quality based on the control information, and commands the UE to change its transmit power accordingly. If a UE were to use transmit power gating, there would then be periods of time in which no control information would be transmitted, and correspondingly, there could be periods of time in which no power change commands would be issued by the Node-B, or periods of time in which if the Node-B were to issue power change commands, the commands would be based on unreliable quality information (signal to interference ratio measurements, for example) because of no control bits having been transmitted for the period of time in which the quality measurements are made (taking into account the time it takes for a transmission from the UE to reach the Node-B).

At present, there are procedures according to which a UE is to declare a radio link failure based on a predetermined threshold for minimum quality of the signal from the Node-B, and a predetermined value for a number of consecutive below threshold quality indications. These procedures and the predetermined threshold and number of below minimum quality indications assume continuous transmit power by the UE. But if a UE were to gate its uplink, then because the Node-B would in effect follow and gate its downlink (because of having no control information to estimate the uplink quality from when the UE is not transmitting), and because the UE uses the downlink as a basis for estimating the quality of the radio link, the UE could declare a radio link failure when in fact there would be no such failure. The apparent inability to "hear" the Node-B for a period of time would be due simply to the Node-B not transmitting during that period of time, not because of poor radio link quality.

What is needed, therefore, is a way to adapt the procedure for declaring a radio link failure, and also related procedures, in case of a UE gating its uplink.

UTRAN with WCDMA as the radio technology is a particular example of the need for a new procedure for declaring a radio link failure. First consider the need for gating by a UE. When no dedicated channels (DCHs)—and thus, no dedicated physical data channels (DPDCHs) (which carry payload as well as high-level signalling)—have been configured in the uplink (UL), all data is transmitted on the enhanced data channel (E-DCH), which is mapped to the enhanced dedicated physical data channel (E-DPDCH). Control signalling associated with E-DCH is transmitted on E-DPCCH. E-DPDCH and E-DPCCH are discontinuous, i.e. they are transmitted only when there is data to be transmitted and the transmission has been granted by the network. For an E-DCH transmission, a grant is needed: a non-scheduled grant for non-scheduled MAC-d (media access control-d) flows and a serving grant (and an allowed, active HARQ process) for scheduled transmissions.

The UL DPCCH carries control information generated at Layer-1 (i.e. the physical layer of the protocol stack). The layer-1 control information consists of e.g. known pilot bits for supporting channel estimation for coherent detection, for use in the Node-B determining transmit power control (TPC) commands to downlink (DL) on DPCH or on Fractional-DPCH (F-DPCH), feedback information (FBI), and an optional transport format combination indicator (TFCI).

UL DPCCH is continuously transmitted (even if there is no data to transmit for awhile), and there is one UL DPCCH for each radio link. Continuous transmission is acceptable with circuit-switched services, which typically send continuously. For bursty packet services, however, continuous DPCCH transmission is less desirable because it has substantial overhead.

The uplink capacity can be increased by decreasing the control overhead. One possibility for decreasing control overhead is UL DPCCH gating, i.e., not transmitting DPCCH all the time. A pattern could (at least in part) define the DPCCH transmission time periods and/or DPCCH may depend (also) on E-DCH and HS-DPCCH transmission times. (Other rules may in effect supercede the pattern so that from time to time the UE may uplink during what would ordinarily be an off-period/gap in the transmission, with the net result being irregular transmission, i.e. not strictly according to a pattern.) Gating can provide UE power saving and so longer battery life, depending on the duty cycle, i.e. the length of on period for DPCCH compared to the off period. Also, interference with other UEs could be reduced, and thus network capacity could be increased.

F-DPCH carries TPC command bits to a UE determined by the Node-B serving the UE, based on data and/or control information uplinked by the UE on DPCCH. F-DPCH is currently transmitted every time slot, independently of the data or control transmission activity by the UE, i.e. independent of whether the UE gates the DPCCH. However, in case of UL DPCCH gating by the UE so that an UL DPCCH time slot does not contain and data and/or control transmission by the UE (i.e. because the UE does not transmit during that UL DPCCH time slot on account of its gating), the Node-B cannot derive a sensible power control command corresponding to the time slot, to transmit on F-DPCH. Thus, if UL DPCCH is to be gated, F-DPCH and/or DL DPCCH could also be gated and/or discontinuously received. Discontinuous DL transmission decreases downlink interference and corresponding discontinuous reception by the UE improves UE battery consumption.

With respect to power control commands issued by the serving Node-B, a UE is considered out-of-sync (not synchronized) if the DL DPCCH quality or the quality of the TPC fields of the F-DPCH frame received from the serving HS-DSCH cell over the previous 160 ms period is worse than a threshold $Q_{out}$ defined (implicitly) by tests in 3GPP TS 25.101. A UE is considered in-sync (synchronized) if the UE estimates the quality of the DL DPCCH or the TPC fields of the F-DPCH frame received from the serving HS-DSCH cell over the previous 160 ms period to be better than a threshold $Q_{in}$, also defined (implicitly) by tests in 3GPP TS 25.101.

According to 3GPP TS 25.101, if a UE estimates the DPCCH quality or the quality of the TPC fields of the F-DPCH frame received from the serving HS-DSCH cell over the last 160 ms period to be worse than the threshold $Q_{out}$, the UE is to turn its power off. On the other hand, if a UE estimates the DPCCH quality or the quality of the TPC fields of the F-DPCH frame received from the serving HS-DSCH cell over the last 160 ms period to be better than the threshold $Q_{in}$, the UE is to turn its power on. A UE is to determine that radio link failure has occurred if after some number N313 of consecutive out-of-syncs have been indicated (N313 being the label of a parameter whose value is the number), less than some number N315 of successive in-syncs are indicated before some number T313 of time periods expires (where the counting toward the number T313 is starting from when the N313 consecutive out-of-syncs are indicated).

DISCLOSURE OF INVENTION

The invention provides a method for use by a user equipment wireless communication terminal, comprising: determining on periods and off periods of a gated transmission in connection with receiving power control commands over a downlink channel of a radio access network; and varying a procedure used to determine when to declare a radio link failure based on the gated transmission by actually and/or effectively varying a quality measurement period used in the procedure or a parameter value used in the procedure. To actually vary a parameter, the value of the parameter would be changed. To only effectively vary a parameter, a procedure using the parameter is changed but the value of the parameter is not changed (so that the same parameter value then has a different effect).

Corresponding equipment, including computer program products and application specific integrated circuits are also provided. In addition, wireless terminals are provided including such equipment and so operative according to methods provided by the invention. Also, a wireless communication system including elements communicatively coupled to such wireless terminals are also provided.

BRIEF DESCRIPTION OF THE DRAWINGS

The above and other objects, features and advantages of the invention will become apparent from a consideration of the subsequent detailed description presented in connection with accompanying drawings, in which:

FIG. 2 is a block diagram showing a layer one (physical layer) of a protocol stack implemented in the UE receiving as inputs information indicating the gated downlink, and also the sync parameter values in case of no downlink gating, and providing changed sync parameters.

FIG. 3 is a flow chart of the operation of a UE, according to the invention.

FIG. 4 is a flow chart of the operation of a Node, B according to the invention.

BEST MODE FOR CARRYING OUT THE INVENTION

Figure 1A:
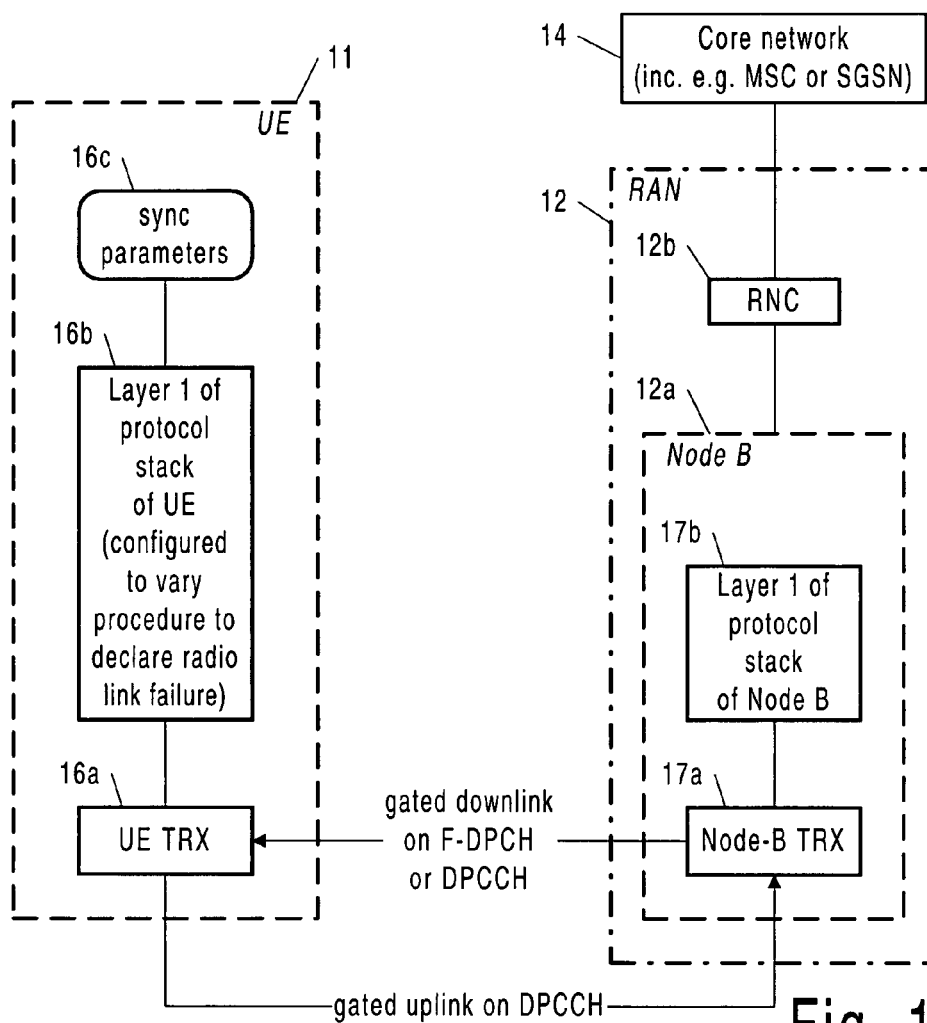
FIG. 1A is a block diagram/flow diagram of a UE and a Node-B communicatively coupled via a radio link including a gated uplink channel and a gated downlink channel, and showing parameters stored in the UE for use in (among other things) determining when to declare a radio link failure.

The invention provides a method by which a UE, communicatively coupled to a Node-B of a UTRAN (UMTS radio access network) (or coupled to a corresponding entity of a radio access network on another cellular technology), adapts to gating (so as to perform what is sometimes called discontinuous transmission) of a downlink channel (F-DPCH or DPCCH) carrying power control commands from the Node-B. As explained above, such gating of the downlink can be the direct result of gating of the uplink by the UE, or can be at least associated with such gating, and the downlink gating is presumed known or knowable to the UE (as a result of monitoring/measurements or other mechanism not the subject of the invention). As also explained above, the UE is required by standards to turn its power off in case of a number of consecutive out-of-sync indications, each corresponding to a determination that a quality metric for receiving control commands from the Node-B is below a threshold $Q_{out}$. Without adapting to such gating, the UE could turn its power off more than is desirable because of out-of-sync indications due simply to the Node-B not transmitting for a period of time—the off period of an on/off duty cycle. As indicated above, what is needed therefore, is a way to adapt the procedure for declaring a radio link failure, and also related procedures, in case of a UE gating its uplink.

In case of gating, different options exist for how the out-of-synch criterion could be determined. In general, according to the invention, to accommodate gating by the Node-B, the UE actually and/or effectively varies one or more parameter values used to determine when to declare a radio link failure based on the downlink gating. To actually vary a parameter, the value of the parameter is changed. To effectively vary a parameter, a procedure using the parameter is changed but the value of the parameter used in the procedure is not. For example, a procedure could require a number N of occurrences of an event in a time T. To actually vary N, the value of N would be changed, but not (necessarily) the value of T. (Alternatively, the value of T could be actually changed.) To effectively vary N, how T is measured could be changed. (This can also be viewed as effectively changing the value of T.) For example, the procedure could be changed so that off-period of a duty cycle does not count in measuring T.

Now in a first option for how the out-of-synch criterion could be determined, the $Q_{out}$ and $Q_{in}$ thresholds and the measurement window (the 160 ms time period) could be kept unchanged, and values for the parameters N313, T313 and N315, could be signaled to a UE to achieve the desired behavior for the downlink gated transmission. However, this has as a disadvantage lowered reliability of $Q_{in}$ or $Q_{out}$ due to a lower number of samples. In addition, the parameters are currently broadcast, and so they would need to be separately set for each user having a different gated transmission.

In a second option, the thresholds and parameters could be kept unchanged, but the measurement window could be increased (from 160 ms), or instead only effectively increased by counting only time increments when according to the gated transmission by the Node-B there is an actual downlink transmission. With both approaches—increasing the window or only changing how time is counted as contributing to the window—the measurement window could be set so that the number of evaluated samples (in terms of TPC commands) would be kept constant. This way the reliability of $Q_{in}$ or $Q_{out}$ could be improved.

In a third option, the option provided by the invention in at least some embodiments, the N313, T313 and N315 parameter values would be broadcast by the network as before (and so known to all UEs served by the Node-B broadcasting the parameters). However, a UE would autonomously adjust one or more of the broadcast values for the N313, T313 and/or N315 parameters based on an on period and an off period of a gated transmission having an on/off duty cycle and associated with the transmission of the power control commands on the downlink channel of the radio access network, based on a predetermined methodology. In some other embodiments, the UE could adjust the values it used for the thresholds $Q_{out}$ and $Q_{in}$.

In case of a UE changing the values it uses for one or more of the N313, T313 and N315 parameters, the methodology could, for example, increase the value of the T313 value and so lengthen the time before a radio link failure is declared (and perhaps prevent declaring a radio link failure because of allowing more time to receive an in-sync indication after N313 out-of-sync indications). For example, the T313 parameter would be increased by the percentage of time the Node-B is not transmitting compared to the total time. Alternatively, the methodology could increase the number N313 to require a greater number of out-of-sync indications, and again for example, in direct proportion to the off period of the duty cycle compared to the whole period of the duty cycle. (This alternative starts the T313 and N315 usage and thus has the greatest impact.) In still another alternative, the methodology could decrease the number N315 and so decrease the number of consecutive in-sync indications (before T313 units of time has expired) required to prevent a declaration of radio link failure (after N313 consecutive out-of-sync indications have been observed).

The invention also encompasses changing not just one of the N313, T313 and N315 parameters, but any combination of these parameters. Also, instead of changing a parameter value in direct proportion to the length of the off-period of the gated transmission (i.e. the off-period of the duty cycle of the UE transmitter), the parameter values could be changed in some other proportion, i.e. in a non-linear way.

As an alternative to changing the values of the N313, T313 and N315 parameters, the UE could change how it counts consecutive out-of-sync indications, and how it counts consecutive in-sync indications, and/or how it measures the time period corresponding to T313. The UE could, for example, only count as a consecutive out-of-sync indication an indication of out-of-sync occurring in a time when the Node-B gated transmission is in an on-period, i.e. when the Node-B is known by the UE to be transmitting. Similarly for the counting up to N315 in-sync indications, and similarly for measuring time after N313 consecutive out-of-sync indications (i.e. time would be measured only when the Node-B is known to be transmitting). Thus, the UE could only effectively change one or more of the N313, T313 and N315 parameter values, by changing how the UE determines whether a condition(s) corresponding to the one or more parameter values has occurred, e.g. changing the procedure used to monitor out-of-sync indications so as to count as a consecutive out-of-sync indication such an indication only if the out-of-sync indication occurs during the on period of the on/off duty cycle (and only if there has not been an in-sync indication anytime between the most recent previous out-of-sync indication occurring during an on period).

In order to vary (one or more of) the N313, T313 and N315 parameters (actually or just effectively), the UE must learn/determine the on period and the off period of the on/off duty cycle used by the Node-B of the radio access network in gating the downlink channel conveying the power control commands. One way for the UE to determine the on and off periods of the duty cycle is by assuming that they are the same as the on and off periods of the duty cycle used by the UE in gating its uplink (on DPCCH), and so equating the downlink gated transmission by the Node-B to the uplink gated transmission of the UE. Another way is to monitor the downlink, observing the pattern of variation in received power on the gated downlink channel (for example, the F-DPCH in case of WCDMA and UTRAN), and equating the off period of the gated downlink pattern to the observed period of low received power, and equating the on period to the observed period of higher low received power. Another way is for the UE to receive via signaling from the Node-B information indicating the gated transmission used by the Node-B, and to determine from the signaling the on period and the off period of a duty cycle.

As mentioned, a UE could also change one or more of the values it uses for the thresholds $Q_{out}$ and/or $Q_{in}$. This could be as an alternative to changing one or more of the N313, T313 and N315 parameters, or in addition. A UE could autonomously adjust the values it uses for the thresholds $Q_{out}$ and/or $Q_{in}$, or it could select the values of the thresholds from a predefined set (in determining when out-of-sync or in-sync occurs and through out-of-sync/in-sync indications determining when a radio link failure is deemed to have occurred).

Instead of gating the downlink channel (and in particular, F-DPCH or DPCCH), the downlink channel could be continuously transmitted but discontinuously power controlled due to uplink gating, i.e. power control commands could be sent only in downlink time slots corresponding to uplink time slots when the UE is transmitting. Alternatively, the downlink channel (F-DPCH or DPCCH) could be continuously transmitted, but discontinuously received by the UE, in order to improve UE power consumption. Discontinuous power control potentially degrades performance during uplink transmission gaps and right after the gaps. Therefore methods could be applied similar to those described above and below (for use in case of a gated downlink channel) that treat downlink transmission during periods corresponding to an uplink transmission gap similarly to downlink off periods (of a gated downlink). Discontinuous reception is in effect the same as a gated downlink channel from the standpoint of F-DPCH usage in the UE and performance.

Referring now to FIG. 1A, a UE 11 is shown communicatively coupled to a Node-B 12a of a UTRAN 12, via a radio link having an uplink and a downlink, where the downlink is gated according to a gated transmission, and the uplink is also gated (and as explained above, may cause the gating of the downlink). As illustrated, the UTRAN-also includes a Radio Network Controller (RNC) 12b, for controlling the Node-B in at least some respects, and for coupling the Node-B to a Core Network 14 (and hence ultimately to other communication terminals, not shown). The UE is shown as including a UE transceiver (TRX) 16a rigged for radio communication with a corresponding Node-B TRX 17a. 6The UE is shown as also including a Protocol Stack Layer-1 16b that operates the UE TRX 16a, and the Node-B is shown as including a peer Protocol Stack Layer-1 17b. The UE is shown as also including a data store 16c for holding values of the various parameters and/or thresholds used in different embodiments of the invention, called here the sync parameters.

Figure 1B:
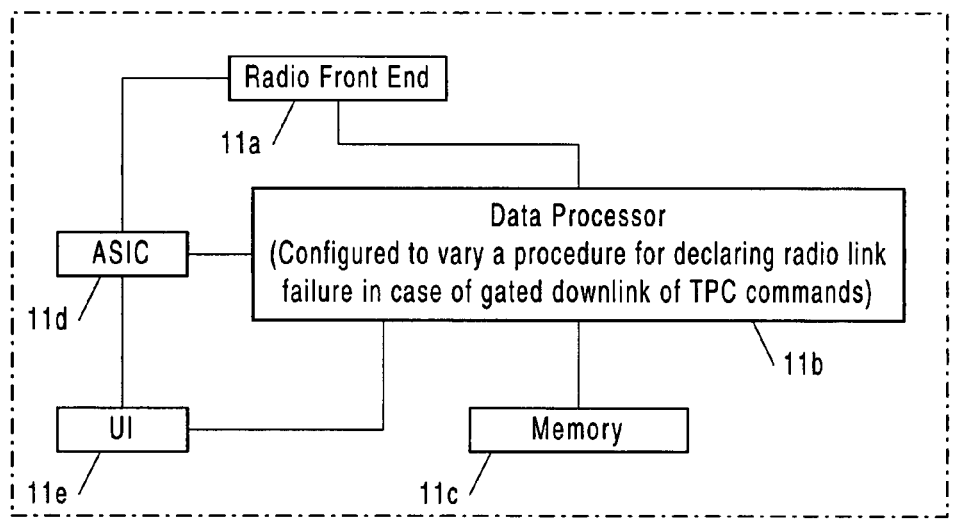
FIG. 1B is a reduced block diagram (only portions relevant to the invention being shown) of the UE terminal or the Node B of FIG. 1A.

FIG. 1B shows some components of the UE 11 of FIG. 1A from a different perspective. The UE is shown as including a suitable radio front end 11a (including a wireless transceiver, not shown) coupled to a data processor 11b that in turn is coupled to a (volatile and/or non-volatile) memory structure 11c. The data processor can be for example a microprocessor, i.e. a programmable digital electronic component that incorporates the functions of a central processing unit on a single semiconducting integrated circuit. The radio front end may include a digital signal processor (not shown), or the data processor 11b may provide digital signal processing in respect to signals transmitted or received by the wireless terminal. The memory structure 11c stores program code that is executable by the processor 11b, including program code that is provided to implement all or part of the invention. The UE 11, as shown, can also include one or more application specific integrated circuits 11d, for providing some or all of the functionality of the UE, as an alternative to providing the functionality via stored instructions executed by the processor. Finally, the UE 11, as shown, includes a user interface (UI) 11e (usually including, among other things, a display, a keypad, a microphone, and a speaker), coupled to the data processor and possibly also to one or more of the one or more ASICs. The UE TRX 16a of FIG. 1A is a component of the radio front end 11a. The UE Protocol Stack Layer-1 16b of FIG. 1A can be implemented so as to include one or more ASICs 11d, and/or program code stored in the memory structure 11c executable by the data processor 11b, and/or one or more components of the radio front end 11a.

Although not illustrated in the drawings, it will be appreciated that each Node-B 12a also includes a radio front end and a data processor and a memory structure and may include one or more ASICs coupled as shown in FIG. 1B, and the RNC 12b also includes a data processor and a memory structure and possibly one or more ASICs.

In general, the various embodiments of the UE 11 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Referring now also to FIGS. 2 and 3, in a first step 31, the UE determines that the downlink is gated, and then in a next step 32 adjusts values of one or more of the sync parameters it uses (actually or only effectively, as described above) compared to values used in case of no gating of the downlink. The term "sync parameter" is used here to indicate any one or more of the N and T parameters (N313, T313 and N315), and/or any one or more of the thresholds ($Q_{out}$ and $Q_{in}$). The adjustment is based on the downlink gated transmission. (As explained above, the adjustment may be based on, or may be proportional to, the off period of the on/off duty cycle of the gated transmission.) In FIG. 2, the UE is shown (optionally) obtaining original values of the procedures and then storing the changed sync parameters (i.e. their values) in a data store of the UE for use for example in determining when to declare a radio link failure (or otherwise responding to out-of-sync or in-sync indications). As indicated in FIGS. 1 and 2, the functionality for changing the sync parameters can reside in the layer one (physical layer) implementation (in hardware or software) of the UE protocol stack.

Referring now to FIG. 4, the Node-B is indicated there as operative according to a first step 41 in which the Node-B determines that the UE is gating its uplink. The Node-B can make such a determination by for example monitoring the power received on the uplink channel in case of a dedicated channel. In a next step 42, the Node-B gates its downlink to correspond to the uplink gating by the UE. For example, as explained above, the Node-B can simply respond to power change requests actually received (during an on period of the UE uplink gated transmission), and even turn off its receiver during the off period of the UE uplink.

The functionality described above as provided by the invention can be implemented as software modules stored in a non-volatile memory of a device such as a mobile station, and executed as needed by the device (or more specifically, an operating system of the device) copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a wireless communication terminal, comprising:
   determining on periods and off periods of a gated transmission in connection with receiving power control commands over a downlink channel of a radio access network; and
   varying a procedure used to determine when to declare a radio link failure based on the gated transmission by actually and/or effectively changing how to measure a parameter value used by the procedure wherein the change in the procedure is to count occurrences of events corresponding to the parameter value only if the events occur during one or another of the on periods of the gated transmission, instead of counting occurrences of such events regardless of when the events occur.

2. A method as in claim 1, wherein the gated transmission corresponds to a gating of transmission power or a gating of only the power control commands or a gating of reception of the power control commands by the wireless communication terminal.

3. A method as in claim 1, wherein the change in the procedure is to count occurrences of events corresponding to the parameter for a period of time longer than in case of no gating.

4. A method as in claim 3, wherein the procedure used to measure when the parameter value is changed includes evaluating power change commands received during a time window, and wherein the change in the procedure is to evaluate power change commands over a longer time window.

5. A method as in claim 4, wherein the longer time window is longer than the time window in case of no gating by an amount such that the same number of power change commands are evaluated as in case of no gating.

6. A method as in claim 1, wherein the procedure uses one or more parameter values including a number N313 of consecutive out-of-sync indications, and/or a number N315 of successive in-sync indications, and/or a number T313 indicating a length of time, and/or a first threshold $Q_{out}$ for minimum quality and/or a second threshold $Q_{in}$ for minimum quality, and wherein the radio link to the radio access network is declared failed according to the procedure if N313 consecutive out-of-sync indications are determined and then a time interval of T313 units of time expires before N315 consecutive in-sync indications are determined, wherein an out-of-sync indication is determined whenever a quality metric for the downlink channel falls below the first threshold $Q_{out}$ for minimum quality, and an in-sync indication is determined whenever the quality metric exceeds the second threshold $Q_{in}$ for minimum quality.

7. A method as in claim 1, wherein the on periods and the off periods each correspond respectively to an on period and an off period of a duty cycle, and wherein at least one of the parameter values is changed from a broadcast or predetermined value by an amount that is based on the off period compared to a whole period of the on/off duty cycle.

8. A computer program product comprising non-transitory a computer readable storage structure embodying computer program code thereon for execution by a computer processor, wherein said computer program code comprises instructions for performing a method according to claim 1.

9. An application specific integrated circuit provided so as to operate according to a method as in claim 1.

10. An apparatus for use by a wireless communication terminal, comprising:
  means for determining on periods and off periods of a gated transmission in connection with receiving power control commands over a downlink channel of a radio access network; and
  means for varying a procedure used to determine when to declare a radio link failure based on the gated transmission by actually and/or effectively, changing how to measure a parameter value used by the procedure wherein the change in the procedure is to count occurrences of events corresponding to the parameter value only if the events occur during one or another of the on periods of the gated transmission, instead of counting occurrences of such events regardless of when the events occur.

11. An apparatus as in claim 10, wherein the gated transmission corresponds to a gating of transmission power or a gating of only the power control commands or a gating of reception of the power control commands by the wireless communication terminal.

12. A user equipment, comprising:
  an apparatus as in claim 10; and
  a transceiver for communicatively coupling with the radio access network, and configured to transmit to the radio access network.

13. An apparatus for use by a wireless communication terminal, comprising:
  a first component of a physical layer implementation of a protocol stack of the wireless communication terminal, for determining on periods and off periods of a gated transmission in connection with receiving power control commands over a downlink channel of a radio access network; and
  a second component of a physical layer implementation of the wireless communication terminal, for varying a procedure used to determine when to declare a radio link failure based on the gated transmission by actually and/or effectively, changing how to measure a parameter value used by the procedure wherein the change in the procedure is to count occurrences of events corresponding to the parameter value only if the events occur during one or another of the on periods of the gated transmission, instead of counting occurrences of such events regardless of when the events occur.

14. An apparatus as in claim 13, wherein the gated transmission corresponds to a gating of transmission power or a gating of only the power control commands or a gating of reception of the power control commands by the wireless communication terminal.

15. An apparatus as in claim 13, wherein the change in the procedure is to count occurrences of events corresponding to the parameter for a period of time longer than in case of no gating.

16. An apparatus as in claim 15, wherein the procedure used to measure when the parameter value is changed includes evaluating power change commands received during a time window, and wherein the change in the procedure is to evaluate power change commands over a longer time window.

17. An apparatus as in claim 16, wherein the longer time window is longer than the time window in case of no gating by an amount such that the same number of power change commands are evaluated as in case of no gating.

18. An apparatus as in claim 13, wherein the procedure uses one or more parameter values including a number N313 of consecutive out-of-sync indications, and/or a number N315 of successive in-sync indications, and/or a number T313 indicating a length of time, and/or a first threshold $Q_{out}$, for minimum quality and/or a second threshold $Q_{in}$, for minimum quality, and wherein the radio link to the radio access network is declared failed according to the procedure if N313 consecutive out-of-sync indications are determined and then a time interval of T313 units of time expires before N315 consecutive in-sync indications are determined, wherein an out-of-sync indication is determined whenever a quality metric for the downlink channel falls below the first threshold $Q_{out}$ for minimum quality, and an in-sync indication is determined whenever the quality metric exceeds the second threshold $Q_{in}$ for minimum quality.

19. An apparatus as in claim 13, wherein the on periods and the off periods each correspond respectively to an on period and an off period of a duty cycle, and wherein at least one of the parameter values is changed from a broadcast or predetermined value by an amount that is based on the off period compared to a whole period of the on/off duty cycle.

20. An apparatus, comprising:
  at least one processor; and
  at least one memory including computer program code, the at least one memory and the computer program code configured to, with the at least one processor, cause the apparatus at least to:
  determine on periods and off periods of a gated transmission in connection with receiving power control commands over a downlink channel of a radio access network; and
  vary a procedure used to determine when to declare a radio link failure based on the gated transmission by actually and/or effectively changing how to measure a parameter value used by the procedure wherein the change in the procedure is to count occurrences of events corresponding to the parameter value only if the events occur during one or another of the on periods of the gated transmission, instead of counting occurrences of such events regardless of when the events occur.

21. A system comprising and the apparatus of claim 20 and a radio access network for communicably coupling to the apparatus by transmitting downlink signals to the apparatus and by receiving uplink signals from the apparatus.

22. A system as in claim 21, wherein the radio access network is configured to:
  determine that uplink signals are being transmitted from the apparatus according to a gated transmission; and
  gate downlink signals to the apparatus to correspond to the uplink gating.

* * * * *